(12) United States Patent
Kurumai et al.

(10) Patent No.: US 7,325,189 B2
(45) Date of Patent: Jan. 29, 2008

(54) WEB SCREEN CREATION METHOD, PROGRAM AND SERVER

(75) Inventors: Noboru Kurumai, Kawasaki (JP); Tomohiro Matsuzaki, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 368 days.

(21) Appl. No.: 11/068,156

(22) Filed: Feb. 28, 2005

(65) Prior Publication Data
US 2006/0117248 A1  Jun. 1, 2006

(30) Foreign Application Priority Data
Nov. 26, 2004 (JP) .............................. 2004-341599

(51) Int. Cl.
*G06F 15/00* (2006.01)
(52) U.S. Cl. ...................... 715/513; 715/514
(58) Field of Classification Search ............ 715/501.1, 715/513, 500, 514
See application file for complete search history.

(56) References Cited

U.S. PATENT DOCUMENTS

2001/0049604 A1* 12/2001 Ito et al. .................. 704/270.1
2004/0090458 A1* 5/2004 Yu et al. ...................... 345/760
2005/0154888 A1* 7/2005 Chen et al. ................. 713/168
2005/0268225 A1* 12/2005 Pelegri-Llopart et al. ... 715/513

FOREIGN PATENT DOCUMENTS

JP  2001-109633  4/2001

* cited by examiner

*Primary Examiner*—Stephen Hong
*Assistant Examiner*—Thu Huynh
(74) *Attorney, Agent, or Firm*—Greer, Burns & Crain, Ltd.

(57) ABSTRACT

Literal character strings and are described directly without using a JSP extension tag in a portion of source statements that displays a component displaying the content repeatedly on a web screen. A mechanism is prepared to construct a component tree containing components generated from the literal character strings through the execution of the source statements. HTML is outputted by execution of components of the component tree, and the content is displayed on the web screen of a browser repeatedly.

12 Claims, 17 Drawing Sheets

PRIOR ART
FIG. 2A
```
<f:view>
  <h:form>
    <h:outputText value="PASSWORD"/>
    <h:inputText value="#{login.passwd}"/>
    <h:commandButton value="SEND"/>
  </h:form>
</f:view>
```
212
PRIOR ART
FIG. 2B
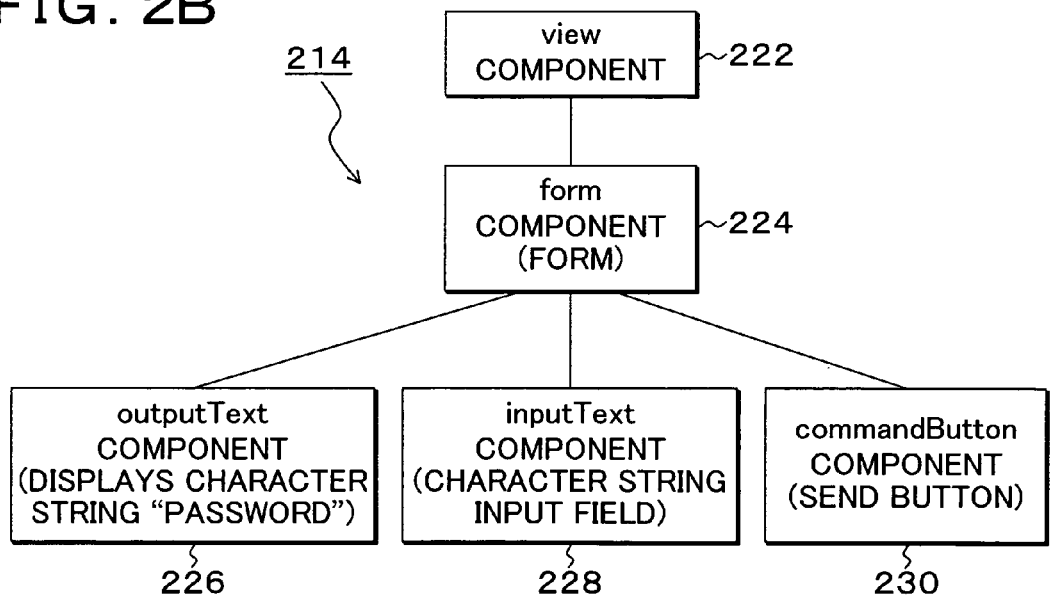
PRIOR ART
FIG. 2C
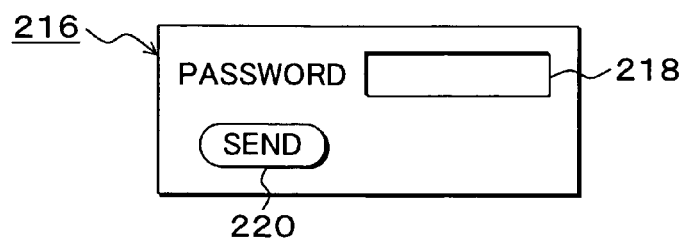

FIG. 3A  PRIOR ART
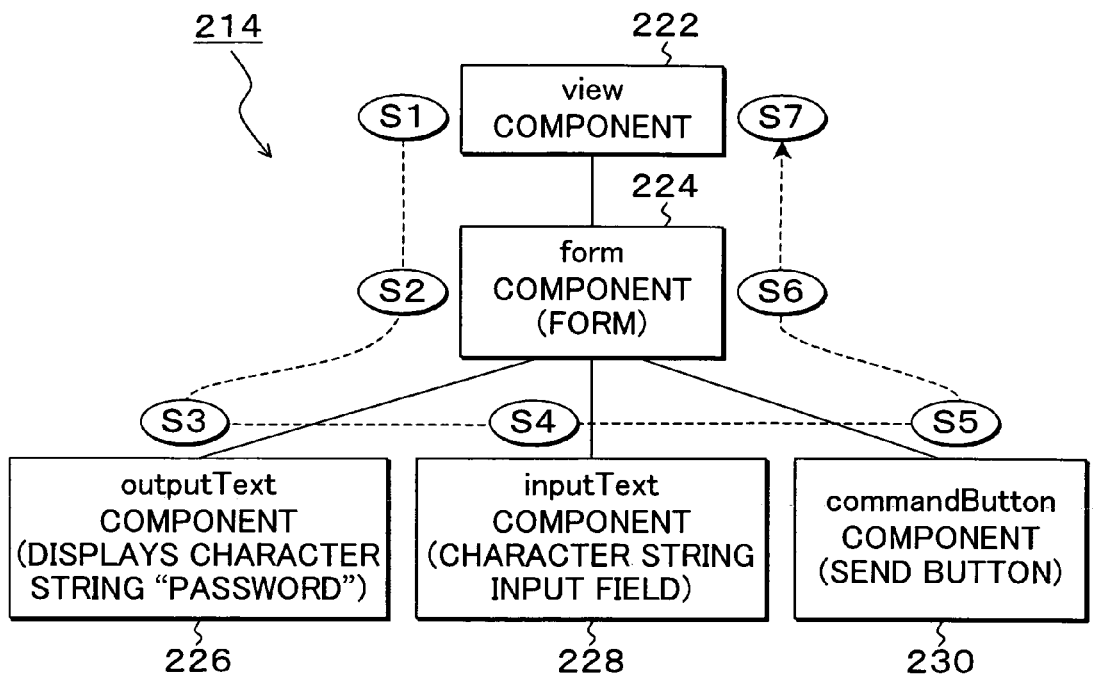
FIG. 3B  PRIOR ART
| | |
|---|---|
| OUTPUT AT S2 → | `<FORM>` |
| OUTPUT AT S3 → | PASSWORD |
| OUTPUT AT S4 → | `<INPUT name="....">` |
| OUTPUT AT S5 → | `<INPUT type="submit" value="SEND">` |
| OUTPUT AT S6 → | `</FORM>` |
FIG. 3C  PRIOR ART
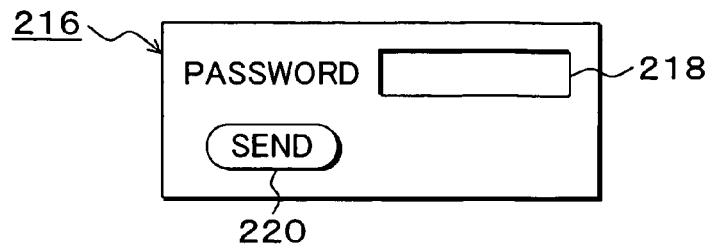

PRIOR ART
FIG. 5A
250
```
1  <f:view>
2    <uji:list>
3      <uji:listRenderer type="element">
4        <h:outputText value="<li>"/>
5        <uji:value />
6        <h:outputText value="</li>"/>
7      </uji:listRenderer>
8    </uji:list>
9  </f:view>
```
252 (lines 3–7)
PRIOR ART
FIG. 5B
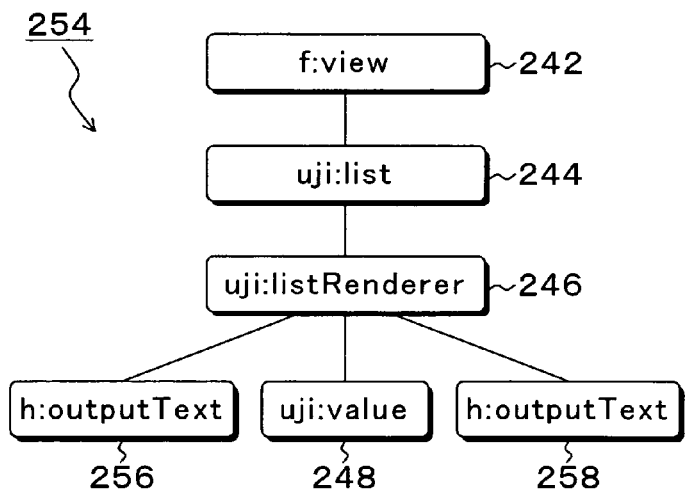
PRIOR ART
FIG. 5C
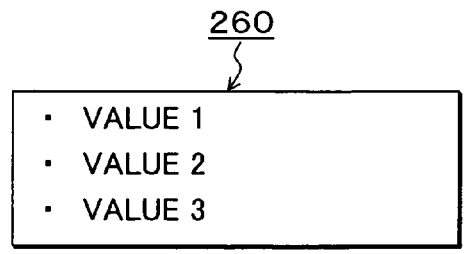
260
- VALUE 1
- VALUE 2
- VALUE 3

FIG. 9A
```
1  <f:view>
2    <uji:list>
3      <uji:listRenderer type="element">
4        <li><uji:value /></li>
5      </uji:listRenderer>
6    </uji:list>
7  </f:view>
```
34
36
FIG. 9B
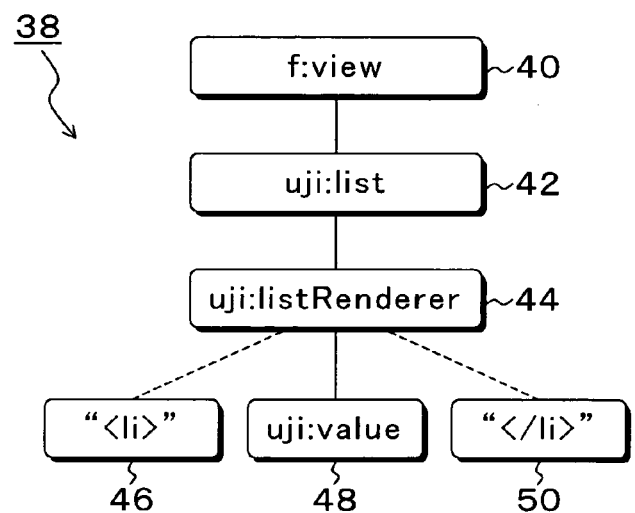
38
FIG. 9C
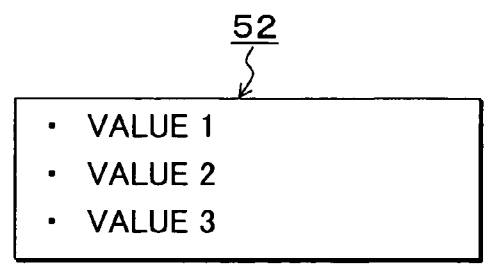
52

1  <FIRST EXTENSION START TAG>
2   <FIRST LITERAL CHARACTER STRING>
3   <SECOND EXTENSION START TAG><SECOND EXTENSION END TAG>
4   <SECOND LITERAL CHARACTER STRING>
5  <FIRST EXTENSION END TAG>

1  <TAG A>
2   <hr>
3   <TAG B></TAG B>
4   <br>
5  </TAG A>

US 7,325,189 B2

WEB SCREEN CREATION METHOD, PROGRAM AND SERVER

This application is a priority based on prior application No. JP 04-341599, filed Nov. 26, 2004, in Japan.

BACKGROUND OF THE INVENTION

1. Field of the Invention

The present invention relates generally to a web screen creation method, program, and server displaying components such as an input field and a button dynamically on a web screen of a browser, and more particularly, to a web screen creation method, program, and server that enables a component to repeatedly display a value of content such as a list to be displayed on the web screen repeatedly in a dynamic manner.

2. Description of the Related Art

Up to now, JavaServer Pages (hereinafter referred to as "JSP") is known as a technology to create a web screen dynamically. It is to be noted that Java and JavaServer are registered trademarks. In JSP, as shown in a JSP file 200 of FIG. 1, a screen is created by allowing a JSP extension tag 202 to coexist with a description of screen made by HTML. A part corresponding to the JSP extension tag 202 is replaced with fragments of HTML or a text at a server 204 to implement a dynamic screen. The mechanism of execution of the JSP of FIG. 1 will be explained below. The server 204 executes the JSP file 200 sequentially from the top. Upon the appearance of the JSP extension tag 202, a Java class corresponding to the JSP extension tag 202 is invoked. The invoked Java class outputs a character string. As shown in an output of the JSP execution result 206, the server 204 transmits the part corresponding to the JSP extension tag 202 after replacing the part with a character string 208 outputted by the Java class. Including reference to other objects, reading/writing of a file, access to database and the like, the invoked Java class can execute any basic processing capable of implementing with Java. More specifically, the JSP extension tag processing will be as described below. For the JSP extension tag, one Java class is provided per one type of the JSP extension tag. Upon the appearance of a start tag of the JSP extension tag, the corresponding Java class object is created; and a "tag start processing" of the object is executed. Upon the appearance of an end tag of the JSP extension tag, a "tag end processing" of the object created at the time of the start tag appearance is executed. The part corresponding to the start tag and the part corresponding to the end tag of the JSP extension tag are replaced with the character string outputted by the "tag start processing" and the "tag end processing" of the object; and the character string is transmitted to the browser. Meanwhile, JavaServer Faces (hereafter referred to as "JSF") is known as a technology to create GUI (Graphical User Inter7face) on a web screen. Creation of stand-alone GUI application with JSF is within the range of the specification of JSF, but typically JSF is used to create a screen of web application. In JSF, GUI component such as an input field, a button is called a component. A screen is expressed in a component tree. To create a web screen by JSF it is necessary to define a component tree by some method. For this reason, in using JSF to create a web screen, a component tree is defined in JSP.

For example, a display screen 216 provided with an input field 218 and a button 220 of FIGS. 2A to 2C is expressed with a component tree 214 of FIG. 2B based on JSP file 212 of FIG. 2A. As in FIG. 2B, in creating a component tree with a structure such as a component tree 214 in that a component 224 having a child component 226, a child component 228, and a child component 230, in the inside (content) of a second line and a sixth line of the JSP extension tags corresponding to the component 224, in each of a third line, a fourth line, and a fifth line, the JSP extension tag corresponding to the component 226, the component 228, and the component 230 is described respectively. In addition, in the component tree 214, a component 222 made to be a root has the child component 224. The JSP extension tags of 224 are described in the inside of the JSP extension tags of the component 222 which are described in a first line and a seventh line. The mechanism of execution of JSF is explained next. Display of a web screen created by JSF is roughly divided into two phases and is executed at a phase for creating components and at a phase for outputting HTML.

(1) Component Tree Creation

The component tree is constructed by executing JSP. In a program corresponding to the JSP extension tag, an object of a component corresponding to the JSP tag is created rather than fragments of HTML and text are outputted. In case the JSP tags are surrounded by other JSP extension tags, setup is made in such a way that the object of the component becomes the child of the component corresponding to other JSP extension tags. The component tree is constructed by the above-mentioned processing.

(2) HTML Output

Following the completion of the component tree, the HTML output is executed. The HTML output is executed recursively having the root of the tree at the top as follows.

(A) Execute the output to precede. (Output the content needed to output ahead of the child component).

(B) Execute the output processing of all the child components.

(C) Execute the output to follow. (Output the content needed to output after the child component).

With the component tree 214 in FIG. 3A, the HTML output will be explained. The output processing is executed in turn from step S1 to Step S7. Step S1 and Step S2 are the output to precede; Step S6 and Step S7 are the output to follow. Since the outputText component 226 does not have the child component, the output to precede and the output to follow are executed in succession. Therefore, the output to precede and the output to follow are shown in step 3 in one output. The inputText component 238 and the commandButton component 230 of Step S4 and Step S5 are also the same.

FIG. 3B is an HTML output 232 from Step S2 through Step S6, and the display screen 216 is displayed in FIG. 3C. As described above, JSF offered as standard specification connects the screen components of web application to the components. The relationships between the components are managed by the server side as the component tree. At this time, JSP being standard implementation of JSF, the hierarchical structure of JSP extension tags is mapped in JSP as a component tree. However, the component tree is created only for the JSP extension tags created on the JSF specification. Other literal character strings, for example, tags such as <BR> and <HR> are not included in the component of the tree. The literal character strings refer to the portion not belong to the JSP extension tags.

FIGS. 4A and 4B show a component made to display content repeatedly on a screen. A component such as shown in this drawing will be examined now. A JSP file 234 in FIG. 17A has a repeat portion 236 ranging from a third line to a sixth line. "uji:list" is one of the components of the repeat portion 236, SHAPE ¥* MERGEFORMAT. The "uji:list" controls the repetition. Namely, the intention is to create a component made to output and to display list <uji: value> from a front item <li> to a back item </li> repeatedly. However, the front item <li> and the back item </li> becoming the literal portion in the character strings to be repeated do not exist as components in a UI component tree 240 in FIG. 4B. Drawing is, therefore, cannot be done.

In JSF, therefore, a need to describe the literal portion of the character strings to be repeated in a fourth line in FIGS. 4A and 4B as the JSF extension tags exists. The literal portion is described as the JSF extension tags ranging from the fourth line to the sixth line in FIG. 5A. In this case, for the portion to be repeated, a component 256, a component 248, and a component 258 are constructed as in FIG. 5B; and for example a component made to display "value 1," "value 2," and "value 3" repeatedly as in FIG. 5B can be created.

For the literal portion of the character strings to create a component made to display content repeatedly in the conventional method, when JSF extension tags on JSP file are used, the volume of description increases. The readability drop is also a problem in JSP. Up to now, HTML and JSP have been used to create a web screen. In using HTML and JSP, text as literal character strings displayed fixedly on a screen and HTML tags are to be described in JSP file or in HTML file as they are. However, the need to describe JSP extension tags exists for the literal character strings contained in a component made to display content repeatedly when JSF is used. This need raises the volume of description. JSP extension tags are added to the component made to display content repeatedly. As a result, readability is decreased in comparison with the case of reading the description made by the conventional HTML or JSP. JSF is especially hard to write as well to read for users who previously used HTML or JSP and moved to JSF. The reason is that the new users need to describe literal character strings by rules different from the conventional rules.

SUMMARY OF THE INVENTION

An object of the present invention is to offer a web screen creation method, program, and system in which drawing is enabled without a need to describe JSP extension tags to the literal character string to create a component made to display content repeatedly and thereby to increase descriptiveness and readability.

The present invention also aims to offer a drawing-enabled web screen creation method, program and system in which the description of JSP extension tags is not needed with the literal character strings of a component made to display content repeatedly. Revising components in the existing JSF is not needed in this invention. Changing JSF specification is also unnecessary.

The present invention provides a web screen creation method of a server. The present invention is characterized by a web screen creation method of a server using extension tags that dynamically display on a web screen content provided for standard tags displaying the content fixedly on the web screen, to create source statements that describe extension tag statements to display a component dynamically on the web screen, the sever outputting HTML and displaying the component on the web screen of a browser by executing a component tree constructed based on the extension tag statements of the source statements, the method comprising:

a source statement describing step of directly describing literal character strings without using extension tags for source statements that display a component made to display the content on the web screen repeatedly;

a tree constructing step of constructing a component tree containing the literal character strings by executing the source statements; and an HTML output step of outputting HTML through the execution of each component of the component tree, to allow the display of the component made to repeatedly display the content on the web screen of the browser.

The source statement describing step includes describing, as the source statements allowing the display of the component made to display the content repeatedly on the web screen, a first extension tag statement specifying a drawing format of the content, the first extension tag statement having a first extension start tag and a first extension end tag, and a first literal character string specifying the output start position of the content described in the body of the first extension tag statement, a second extension tag statement without body indicating the iteration value, the second extension tag statement having a second extension start tag and a second extension end tag, and a second literal character string specifying the output end position of the content.

The tree constructing step includes:

capturing a first component corresponding to the first extension start tag and adding the first component to a child component list of a preceding parent component, determining the first extension tag having the body and setting up an extension child component operation object for the first component, capturing a second component corresponding to the second extension start tag and adding the second component to a child component list and an extension child component list of the first component, determining that the extension child component operation object is set for the first component and adding the first literal character string such that the first literal character string is positioned before the first component of the extension child component list, determining that the second extension end tag statement has no body and ending the processing of the second extension end tag, and determining the first extension tag having the body, capturing the second literal character string and adding the second literal character string to the extension child component list.

The tree constructing step includes:

registering in advance a class provided with the extension component list as a variable and with a method to store the literal character string in the extension child component list as operation, and upon the processing of the first extension start tag, assigning to the class a value that has the first component captured corresponding to the first extension start tag as the parent component and generating the extension child component operation object.

A method of the extension child component operation object is invoked by the second extension start tag processing, and includes capturing the first literal character string outputted to the output buffer at that time and storing the first literal character string in the extension component list, and wherein the method is invoked by the first extension end tag processing and includes capturing the second literal character string outputted to the output buffer at that time and storing the second literal character string in the extension child component list. In the web screen creation method of the present invention, the standard tag displaying the content fixedly on the web screen is provided by JavaServer Pages (JSP), and the extension tag displaying the component dynamically on the web screen is provided by JavaServer Faces.

The present invention provides a web screen creation program executed by a computer of a server. The present invention is characterized by a web screen creation program operable to drive a computer of a server using extension tags that dynamically display on a web screen content provided for standard tags displaying the content fixedly on the web screen, to create source statements that describe extension tag statements to display a component dynamically on the web screen, the sever outputting HTML and displaying the component on the web screen of a browser by executing a component tree constructed based on the extension tag statements of the source statements, to execute:

a source statement describing step of directly describing literal character strings without using extension tags for source statements that display a component made to display the content on the web screen repeatedly;

a tree constructing step of constructing a component tree containing the literal character strings by executing the source statements; and an HTML output step of outputting HTML through the execution of each component of the component tree, to allow the display of the component made to repeatedly display the content on the web screen of the browser.

The present invention provides a server for web screen creation. The present invention is characterized by a server using extension tags that dynamically display on a web screen content provided for standard tags displaying the content fixedly on the web screen, to create source statements that describe extension tag statements to display a component dynamically on the web screen, the sever outputting HTML and displaying the component on the web screen of a browser by executing a component tree constructed based on the extension tag statements of the source statements, the server comprising:

a source statement describing unit directly describing literal character strings without using extension tags for source statements that display a component made to display the content on the web screen repeatedly;

a tree constructing unit constructing a component tree containing the literal character strings by executing the source statements; and an HTML output unit outputting HTML through the execution of each component of the component tree, to allow the display of the component made to repeatedly display the content on the web screen of the browser.

The details of the web screen creation program and server according to the present invention are basically the same with the web screen creation method according to the present invention. The mechanism to take a literal character string to beta part of a component tree is introduced in the present invention. In this invention the literal character string is allowed to describe directly without using a JSP extension tag in implementing a component that is capable of displaying content repeatedly in JSF. As a result, the volume of description decreases in comparison with the description made by conventional JSF. Additionally, readability increases for the reason that the literal character string appears as it is in a JSP file. The rules of conventional HTML and JSP are that the literal character string is allowed to be described as it is. Users who used HTML or JSP, therefore, can make use of the rules of the conventional HTML and JSP files in JSF. Descriptiveness and readability of the literal character strings increase as a result. Furthermore, the mechanism of taking the literal character strings to be a part of the component tree is enabled for implementing without changing the specification of JSF. In addition, the existing JSF can be used as it is without reconstructing components for JSF. The above and other objects, features and advantages of the present invention will become more apparent from the following detailed description with reference to the drawings.

BRIEF DESCRIPTION OF THE DRAWINGS

FIGS. 2A to 2C are explanatory diagrams of a processing to construct a component tree from the conventional JSF source statements and to create dynamically a component screen;

FIG. 3A to 3C are explanatory diagrams of a display screen by creation of the component tree and the following HTML output according to the conventional JSF;

FIGS. 5A to 5C are explanatory diagrams of the conventional processing to construct a component tree containing literal characters by rewriting literal characters according to extension JSP tag and to create a component for making the content display repeatedly;

FIGS. 9A to 9C are explanatory diagrams of a JSP file describing source statements to implement a component made to display content repeatedly, a component tree and a web screen, according to the present invention;

FIGS. 13A and 13B are explanatory diagrams of a source file showing in generalization the source statements of the component made to display content repeatedly according to the present invention;

DETAILED DESCRIPTION OF THE PREFERRED EMBODIMENT

Figure 6:
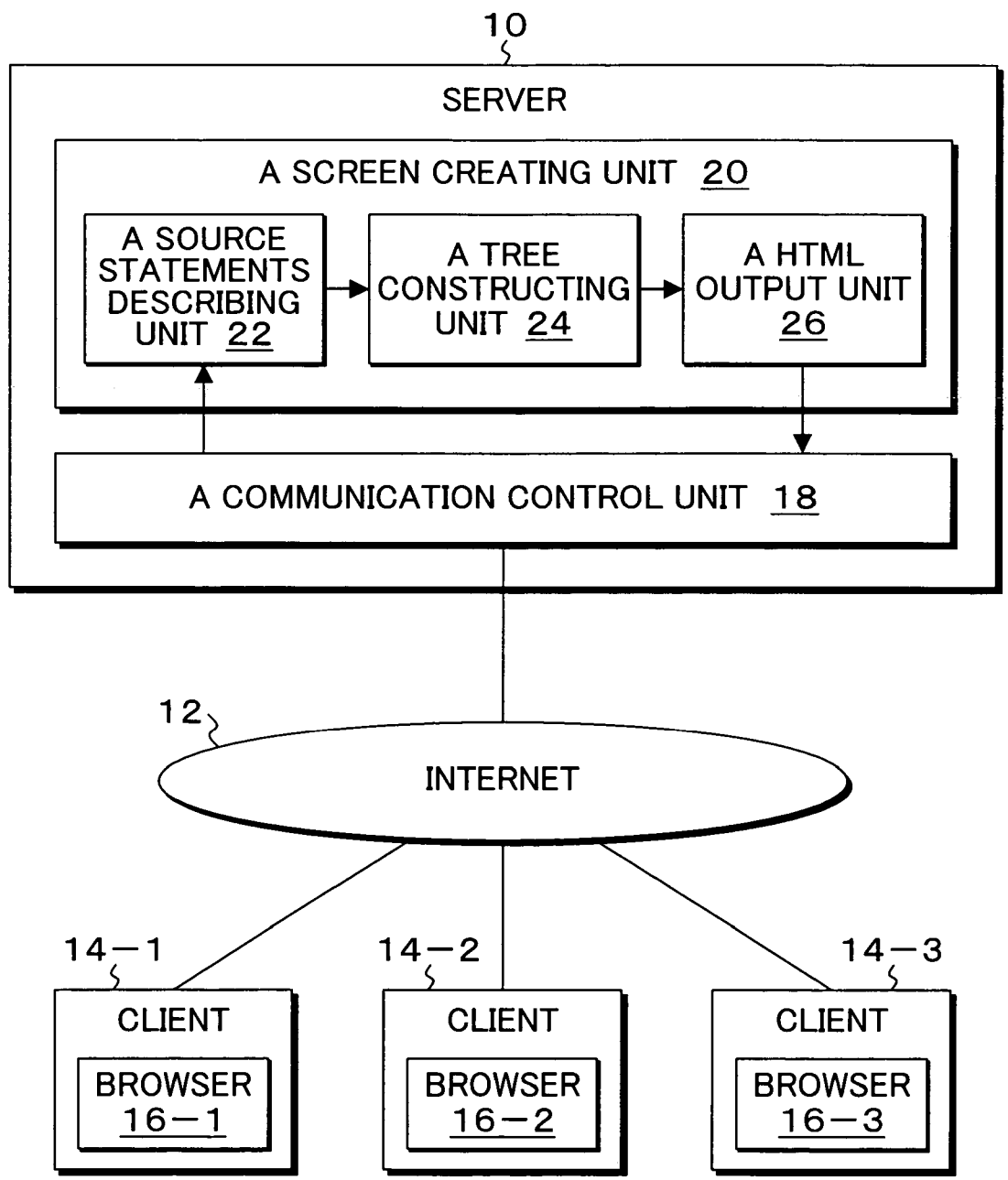
FIG. 6 is an explanatory diagram of network environment provided with a server to which the present invention is applied.

FIG. 6 is an explanatory diagram of a network environment provided with a server to which a web screen creation processing according to the present invention is applied. In FIG. 6, a server 10 providing a web content is connected to a client 14-1, a client 14-2, and a client 14-3 through the Internet 12. Each of the clients of a client 14-1, a client 14-2, and a client 14-3 is provided with a browser 16-1, a browser 16-2, and a browser 16-3 to browse the web content of the server 10 respectively. As a way of example, a case of the client 14-1 issuing a request for browsing the web content to the server 10 through the browser 16-1 will be examined. Upon receiving the request, the server 10 constructs a screen structure resembling a tree based on a screen structure of the original sender of the request. Then the server 10 converts the screen structure to HTML and sends the conversion to the client 14-1. The web screen is displayed by the browser 16-1. The server 10 in FIG. 6 is provided with a communication control unit 18 and a screen creating unit 20. In the screen creating unit 20, a source statement describing unit 22, a tree constructing unit 24, and an HTML output unit 26 are provided. For example, upon receiving the request for browsing the web page from the browser 16-1 of the client 14-1, the screen creating unit 20 constructs a dummy screen on the server side based on the screen structure of the sender of the request. This dummy screen constructed in the server side refers to the creation of content tree reconstructed from a hierarchy of JSF tags described in JSP as Java objects of the server side. The JSF tags are expressed in Java objects called a UI component at the server side. The source statement describing unit 22 provided for the screen creating unit 20 describes literal character strings directly to the source statements 22 displaying a component displaying the content repeatedly on the web screen without using JSP extension tags. The tree constructing unit 24 displays a component tree containing literal character strings. The HTML output unit 26 outputs HTML by executing each component of the component tree. Namely, the HTML output unit 26 outputs HTML by executing the objects; and by the HTML output, the HTML output unit 26 displays the component that displayed the content repeatedly on the web screen of the browser 16-1 of the original sender of the request.

Figure 7:
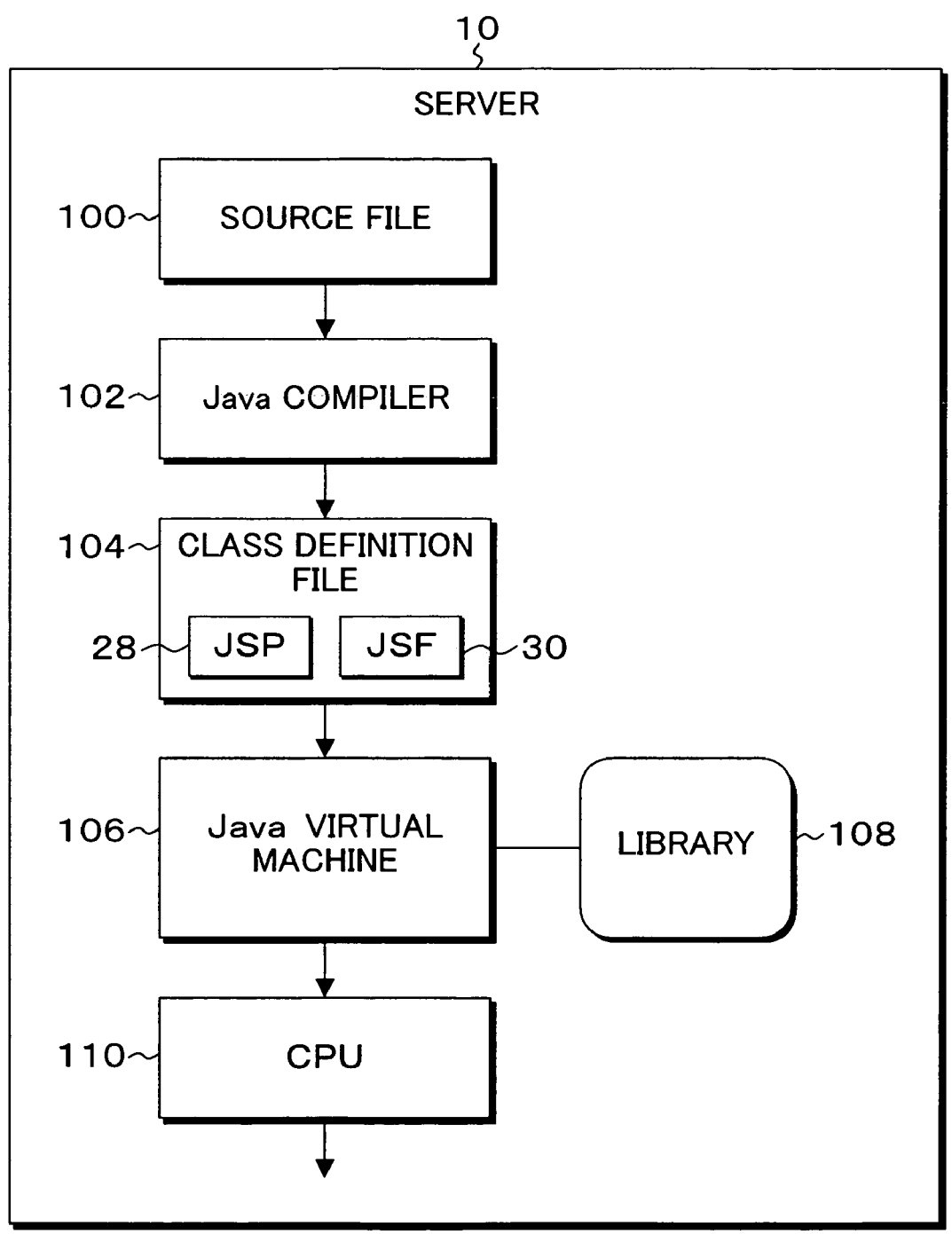
FIG. 7 is a block diagram of an application execution facility of a server carrying out web screen creating processing of the present invention.

FIG. 7 is a block diagram of an application execution facility of the server 10 made to execute a web screen creation processing of the present invention. In FIG. 7, a source file 100, a Java compiler 102, a class definition file 104, a Java virtual machine 106, a library 108 and a CPU 110 are provided for the server 10. A source file 100 is described in an interpreter type language. After converting the source file 100 into an intermediate language called byte code with a Java compiler 102, the server 10 generates objects with a class definition file 104 from class and executes the processing of carrying out the translation of byte code into machine language while referring to a library 108. The Java application execution environment such as this is application made to execute at the server side. For this reason, the application is so called a server applet and a JSP 28 having a specialized display portion is used. The JSP 28 is basically a tag statement to execute a fixed display of a web screen. However, extended JSP tag statements are provided to execute a dynamic display of a web screen. A JSF 30 is, on the other hand, provided to implement input fields and button components dynamically. The JSF 30 implements dynamic display of components by describing JSF tags in JSP tag statements hierarchically.

Figure 8:
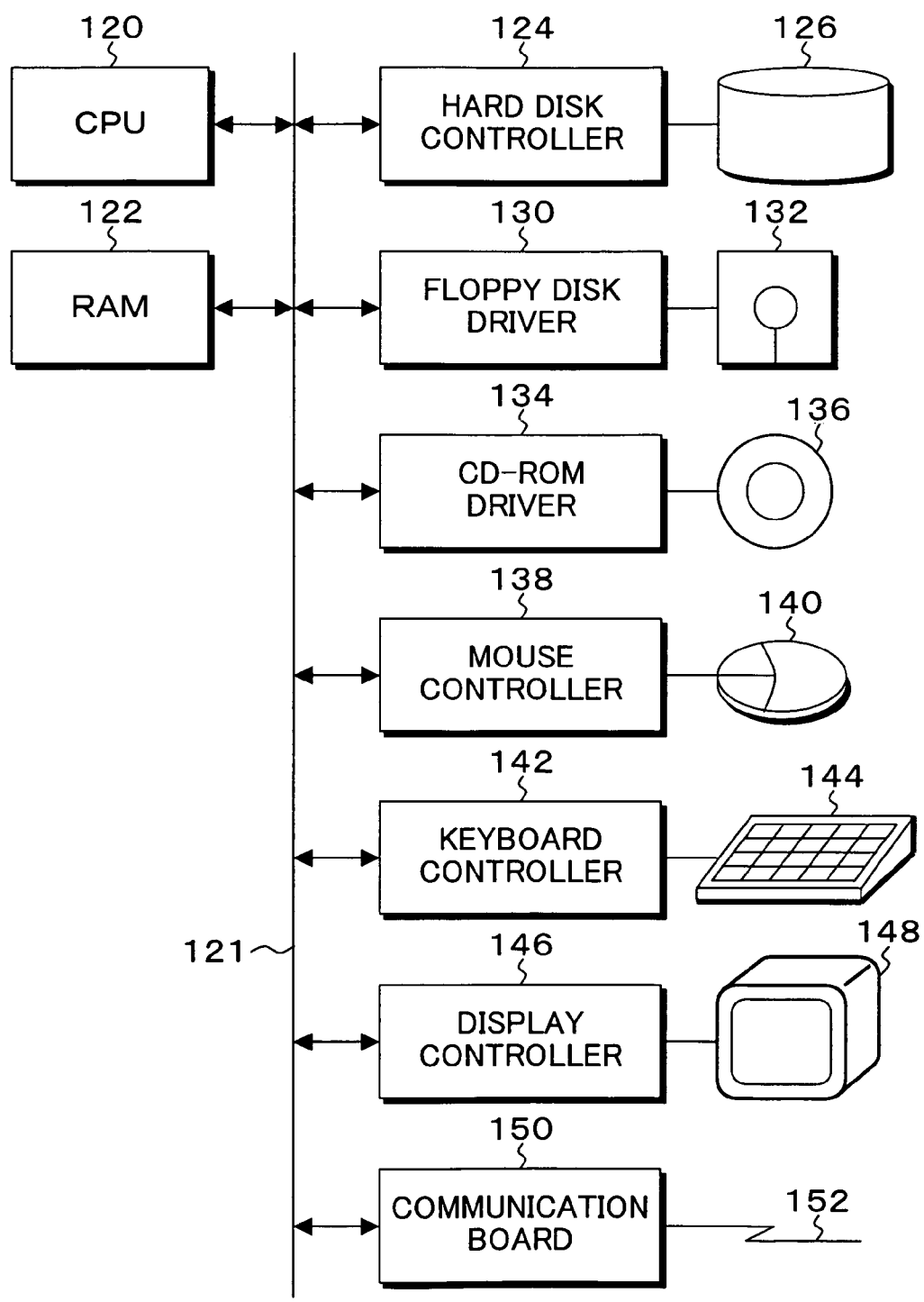
FIG. 8 is a block diagram of hardware environment of a computer to which the server of FIG. 7 is applied.

The server 10 in FIG. 7 is implemented, by way of example, in hardware resources of a computer such as in FIG. 8. In the computer in FIG. 8, a RAM 122, a hard disk controller (software) 124, a floppy disk driver (software) 130, a CD-ROM driver (software) 134, a mouse controller 138, a keyboard controller 142, a display controller 146, a communication board 150 are connected to a bus 121 in a CPU 120. The hard disk controller 124 is loaded with the program connecting a hard disk drive 126 to the hard disk controller 124 and implementing the web screen creation processing of the present invention. Upon the start of the computer, the hard disk controller 124 invokes the necessary program from the hard disk drive 126, develops the program on the RAM 122, and executes the program through the CPU 120. As a floppy disk drive (hardware) 132 is connected to the floppy disk driver 130, reading and writing of a floppy disk (R) is enabled. For the CD-ROM driver 134, a CD drive (hardware) 136 is connected. The data and programs stored in the CD, therefore, can be read. The mouse controller 138 conveys the input operation of a mouse 140 to the CPU 120. The keyboard controller 142 conveys the input operation of a keyboard 144 to the CPU 120. The display controller 146 executes display on the display unit 148. The communication board 150 communicates with clients on the external Internet through a communication line 152 containing wireless.

FIGS. 9A to 9C are explanatory diagrams of a JSP file describing source statements implementing a component made to display content repeatedly, a component tree, and a web screen, according to the present invention. In a JSP file 34 in FIG. 9A, in terms of a portion 36 describing a component made to display content repeatedly, as shown in a fourth line, the literal character string <li> and the literal character string </li> to be implemented in the content are to be described directly without using the JSP extension tags in the present invention. As stated above, by processing the source statements in the JSP file containing the literal character strings described directly without using the JSP extension tag in the JSP file 34, as shown in FIG. 9B, a component tree 38 is constructed generating a literal character string 46 and a literal character string 50 described in the source statements directly as a component as it is in addition to a component 40, a component 42, a component 44, and a component 48. In other words, only a component tree made up by the component 40, the component 42, the component 44, and the component 48 corresponding to the JSF extension tags is constructed in the standard JSF. Thus, under the standard JSF, implementation of a component made to display content repeatedly is cannot be realized. However, for the literal character string 46 and the literal character string 50, a component capable of corresponding in the same way as the JSF extension tag corresponds are generated in the present invention; and the component tree 38 is constructed by setting up a doted line to the component 44 to be a parent component. The HTML conversion is executed by executing each component or each object of the component tree in FIG. 9B constructed according to the present invention. This conversion allows the component to implement the display of "value 1," "value 2," and "value 3" as content displayed repeatedly as shown in a web screen 52 in FIG. 9C. The mechanism of using the literal character strings in the construction of the component tree 38 in the present invention will be explained next. In the specification of JSF, a child component list held by a UI component on the component tree must be a UI component list. In meeting the JSF specification on the child component list, the mechanism to hold an extended extension component list separately as a child component list containing literal character strings is adopted in the present invention.

Figure 10B:
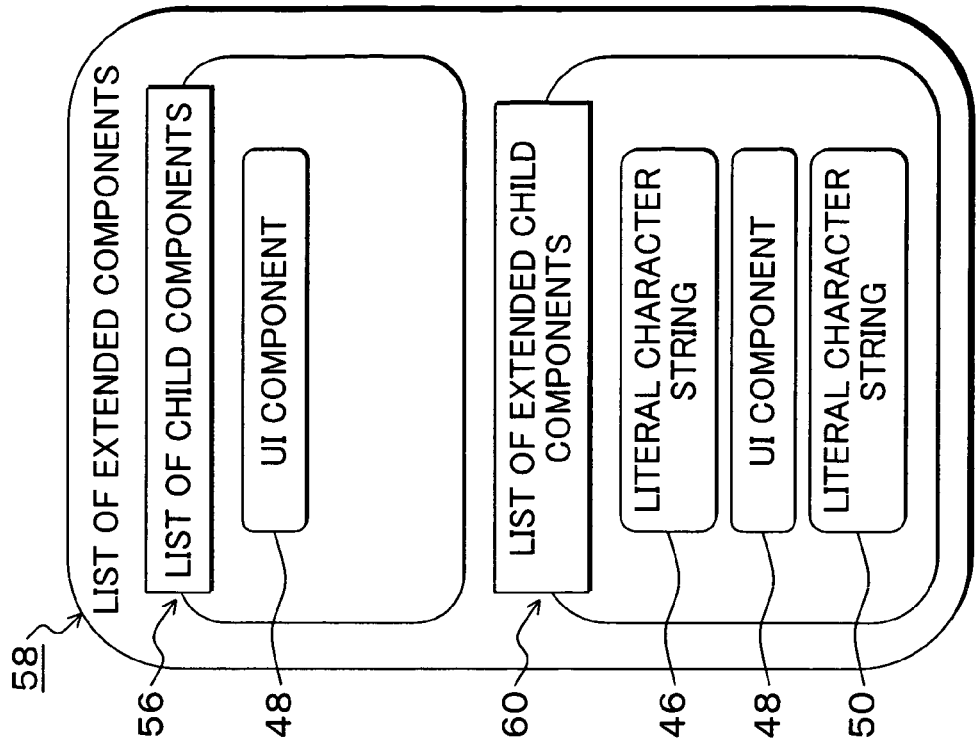
FIGS. 10A and 10B are explanatory diagrams of a component list required for constructing the component tree containing literal character strings in the component.
Figure 10A:
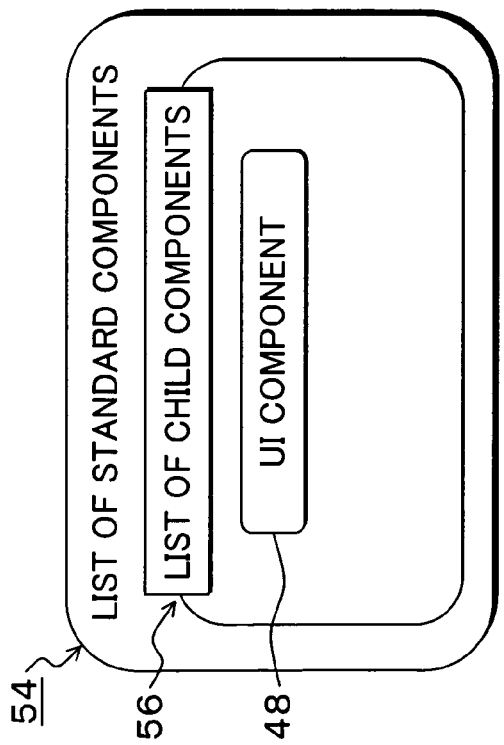

FIG. 10A is a standard component list 54 meeting the JSF specification. The parent component of this standard component list 54 is the component 44 corresponding to the portion 36 made to implement a component for displaying content repeatedly in the component tree 38 in FIG. 9B. A child component list 56 holds the UI component 48 corresponding to the JSF extension tag. As opposed to the standard component list 54 such as in FIG. 10A, as shown in an extended component list 58 in FIG. 10B, in addition to a child component list 56 being the same as the standard child component 54, an extension child component list 60 is added in the present invention. The extended component list 60 holds the literal character string 46 and the literal character string 50 along with the UI component 48. As shown in the fourth line of FIG. 9A, to create the extension child component list 60 such as in FIG. 10B, the literal character string <li> and the literal character string </li> divided by the JSP extended tag <uji:value/> are to be captured. An order of appearance of the literal character strings and the JSP extension tag should be maintained. According to the JSP specification, literal character strings are output by an output buffer. By executing a next processing upon the appearance of the JSP extension tag to be the child, creation of the extension child component 60 holding the literal character strings will be executed.

(1) Read the output buffer and store the output buffer as the literal character string.

(2) Record the UI component corresponding to the JSP extension tag to appear next to the stored literal character string.

Figure 1:
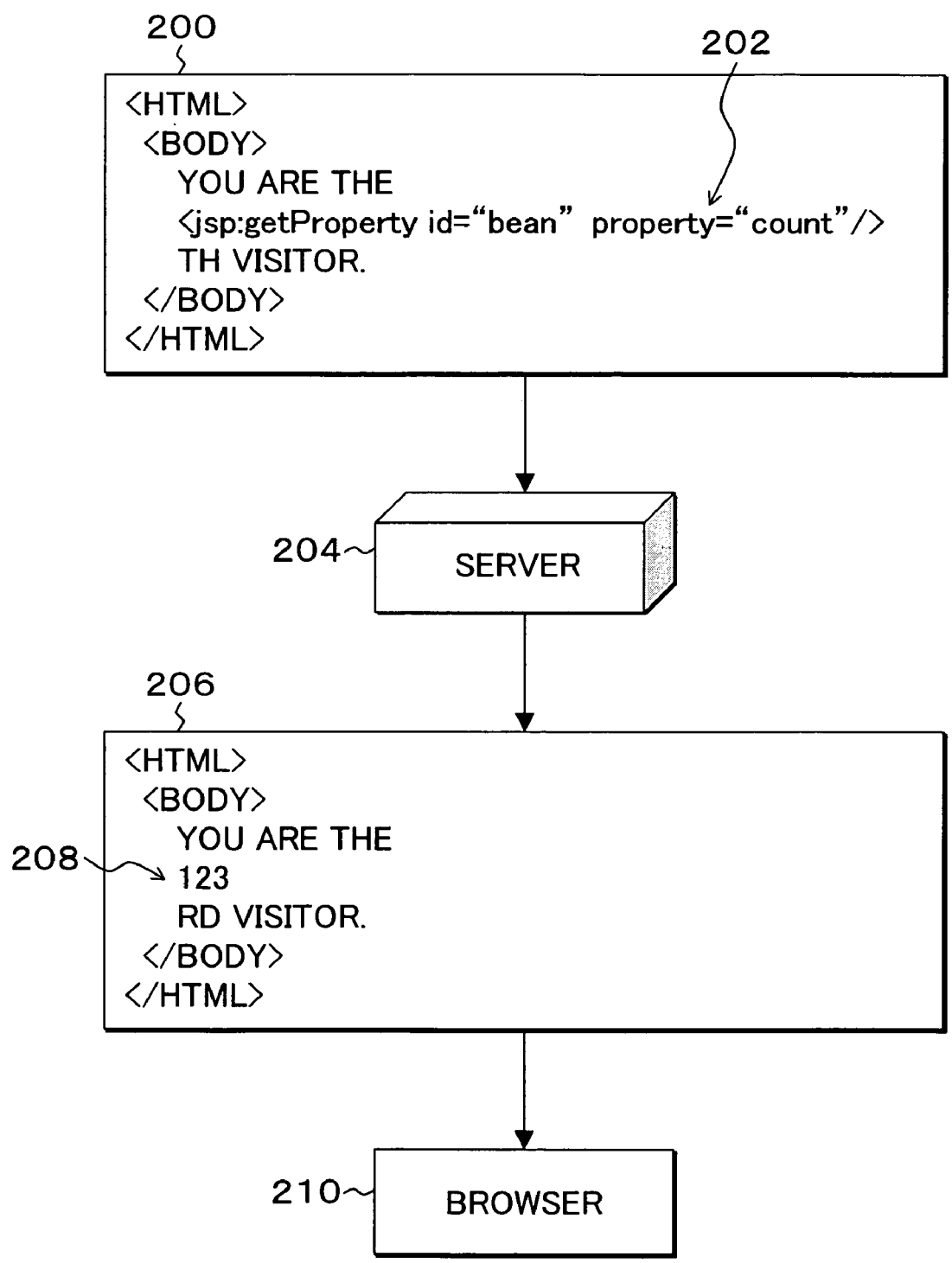
FIG. 1 is an explanatory diagram of dynamic web screen display processing according to the conventional JSP extension tag statements.
Figure 4A:
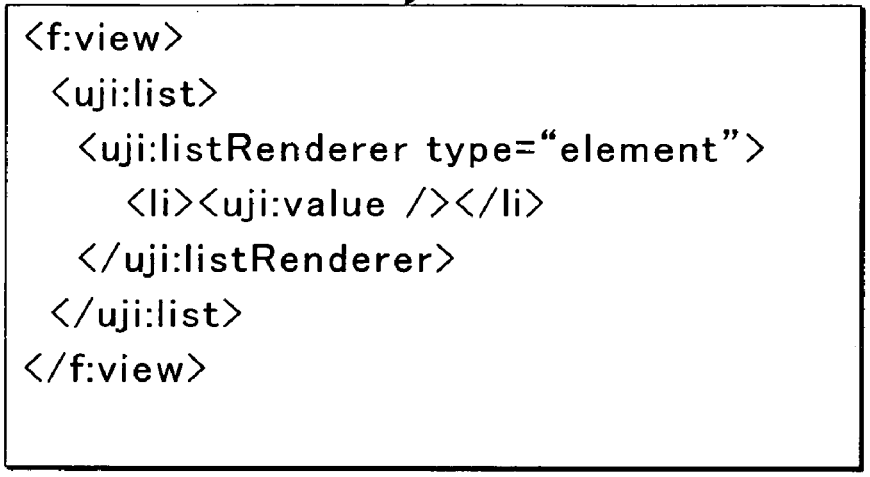
FIGS. 4A and 4B are explanatory diagrams of a drawing-unable JSP file containing literal characters in a component made to display content repeatedly and the component tree generated from the JSP file.
Figure 4B:
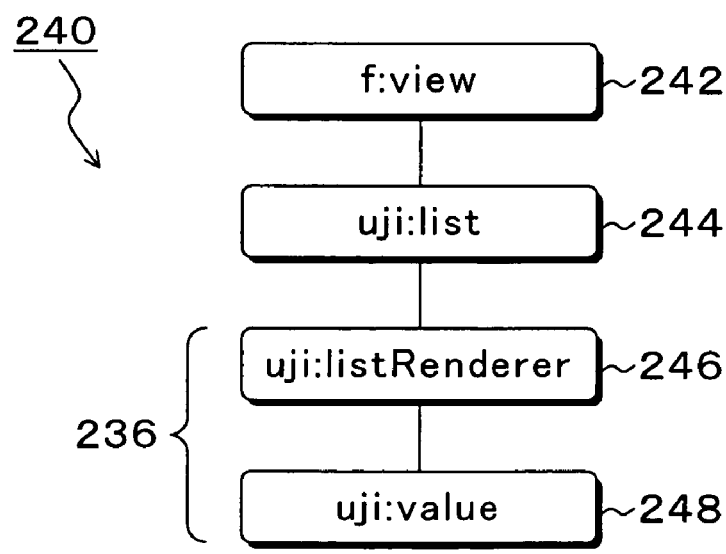
Figure 11A:
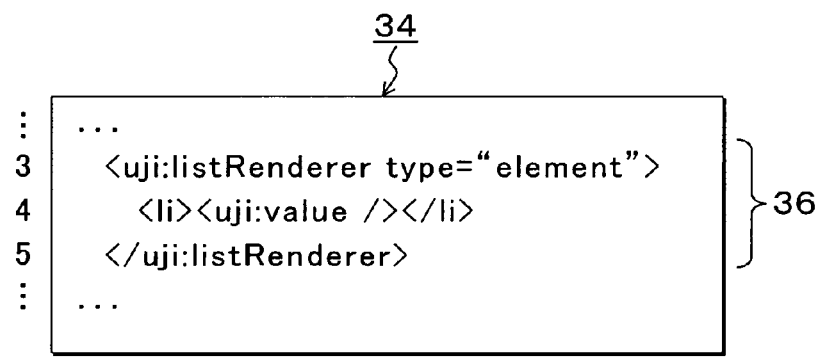
FIGS. 11A and 11B are explanatory diagrams of a portion of the source statements made to display content repeatedly and the component list created.
Figure 11B:
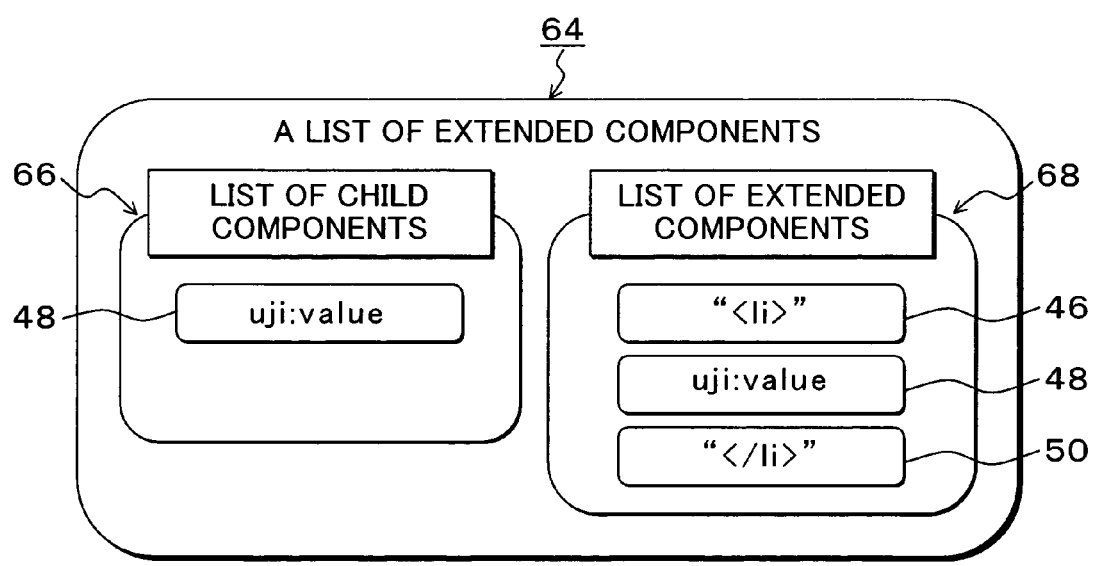

FIG. 11A extracts only the portion 36 made to display the content in the third line to the fifth line of the JSP file 34 in FIG. 9A repeatedly. By processing the portion 36, as shown in FIG. 11B, an extension child component list 68 can be created, the extension child component 68 holding the literal character strings 46 before the UI component 48 and the literal character string 50 after the UI component 48 in addition to a child component list 66 holding the child component list 48 being the same with the case of the, standard component. Before examining a specific method to create the extension child component list 68 holding the literal character string 46 and the literal character string 50, the execution of the JSP file 34 in FIG. 11A extracted from the JSP file 34 in FIG. 4A will be explained. The processing is done in the following order.

(1) With the tag start processing of uji:listRenderer, the object of the uji:listRenderer component is created.

(2) The literal character string <li> is output in the output buffer.

(3) uji:value tag start processing In the uji:value tag start processing, the object of the uji: component is generated. The object is generated as the child of the uji:listRenderer component.

(4) uji:value tag end processing (5) Output </li> to the output buffer (6) uji:listRenderer tag end processing In the present invention, it is assumed to execute the JSP file 34 generated as in FIG. 11A and to create the extension child component list holding the literal character strings. The following mechanism is created in the processing of the present invention with this assumption.

(1) Set up the extension child component creation object of the tag for the component right after the creation of the component at the tag start processing.

(2) In the timing the child component being added to the parent component, the parent component issues an instruction to the parent tag at the (1). Upon having the instruction, the parent tag executes processing by an extension child component operation object.

Figure 12:
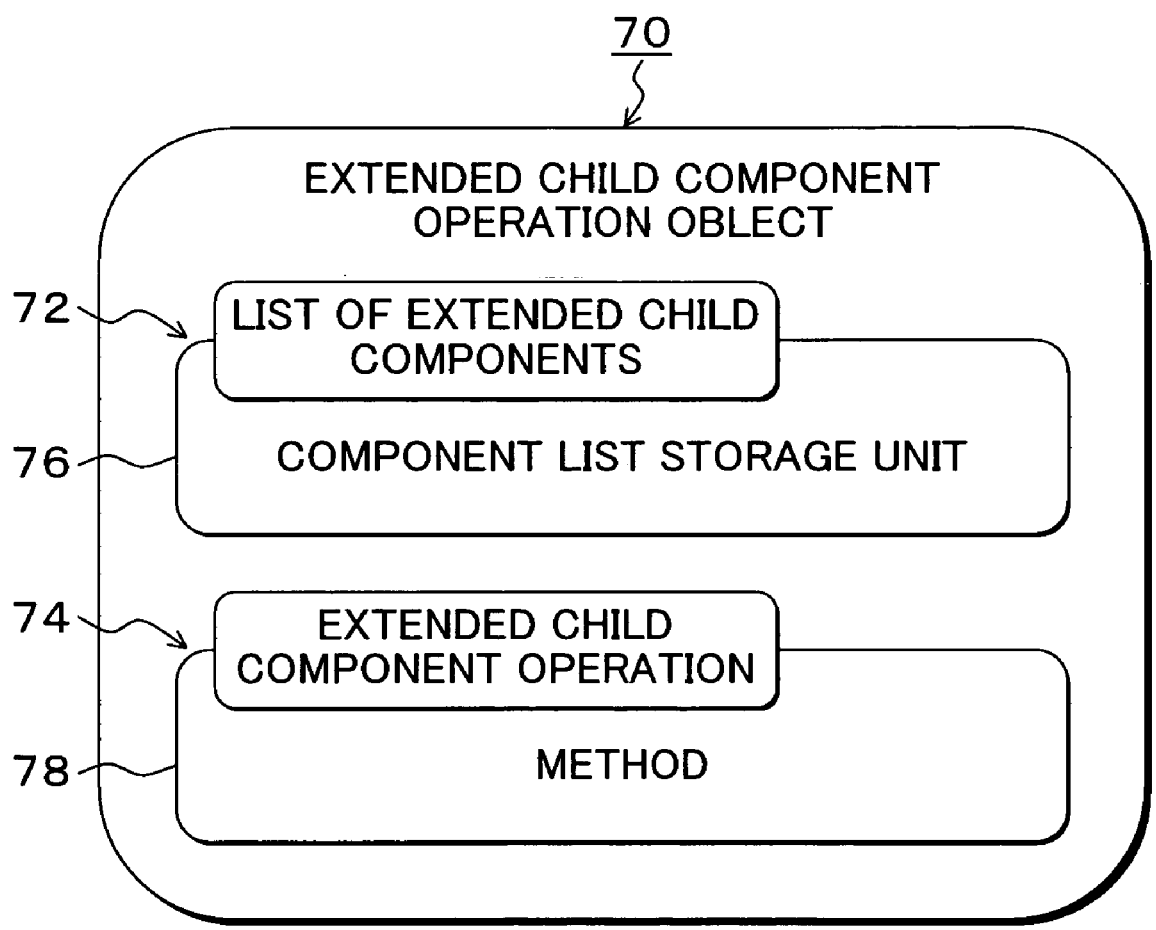
FIG. 12 is an explanatory diagram of an extension child component operation object newly setup in the present invention implementing a mechanism to add literal character strings to the component list.

The extension child component operation object has a variable and operation shown in FIG. 12. In FIG. 12, an extension child component operation object 70 has an extension child component list 72 as a variable and has a component list storage unit 76 in the variable. In addition, an extension child component operation 74 is owned as operation. Upon receiving the extension child component operation 74, the literal character strings are stored in an extension child component list by executing a method 78. Specifically, the method 78 is invoked by the extended tag start processing at the third line in FIG. 11A. At the time, the method 78 captures the literal character string <li> outputted by the output buffer and stores the literal character string in the extended component list 68. In addition, the method 78 is invoked by the extended tag processing of the fifth line in FIG. 11A. At the time, the method 78 captures the literal character string </li> outputted by the output buffer and stores the literal character string in the extended component 68. As explained above, each of the tag start processing and the tag end processing of the extended tag reads the extension child component operation object 70 in FIGS. 11A and 11B and add the literal character string outputted in the output buffer to the extension child component list 68. This processing can be implemented without changing the JSF specification by creating a class object to create the extension child component operation object 70 in FIG. 12 and by registering the class object to the class definition file in advance. Further, the existing JSF components can be used without reconstructing by the content of the component implemented through the mechanism of the component tree containing literal character strings.

FIGS. 13A and 13B are explanatory diagrams of the source file showing in generalization source statements of the component made to display content repeatedly according to the present invention. FIG. 13A is a source file 80 shown in generalization by extracting the component made to display content repeatedly. The first literal character string is described in a first extension tag made up by a first extension start tag and a first extension end tag. A second extension tag made by a second extension start tag and a second extension end tag as well as a second literal character string are described. Here, the first extension tag has a body as shown in the second line to the fourth line; but the second extension tag has no body. FIG. 13B is a representation of a source file 80 in FIG. 13A in symbols as a JSP source file 81 and has the following relationships.

The first extension start tag=tag A
The first literal character string hr
The second extension start tag=tag B
The second extension end tag=/tag B
The second literal character string=br
The first extension end tag=/tag A
Symbol '<' and symbol '>' are omitted.

Figure 14A:
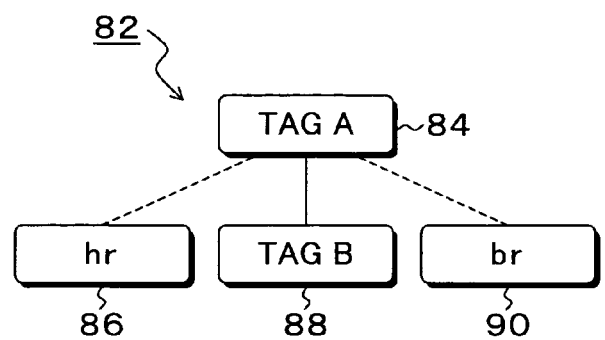
FIGS. 14A and 14B are explanatory diagrams of a component tree and a component list tree generated from the source file of FIGS. 13A and 13B.
Figure 14B:
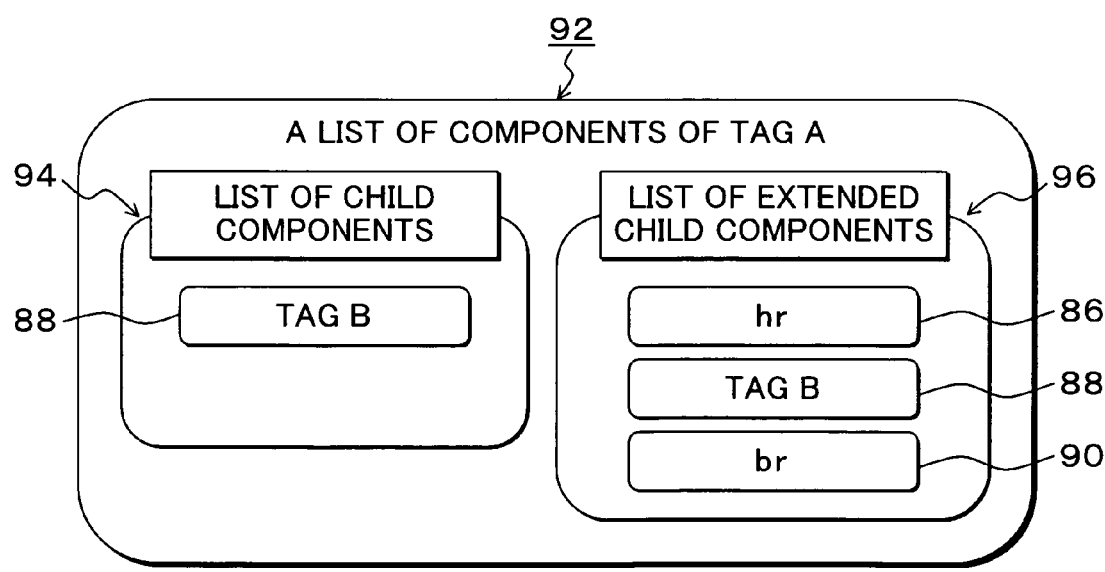

FIGS. 14A and 14B show a component tree 82 constructed by processing of the JSP source file 81 in FIG. 13B. FIG. 14B is a tag A component list 92 to construct component tree 82. The component tree 92 of the tag A holds the UI component 88 of the tag B in the standard JSP child component list 94 and holds the literal character string 86 and the literal character string 90 in the extension child component list 96 in addition to UI component list 88 of the tag B.

Figure 15:
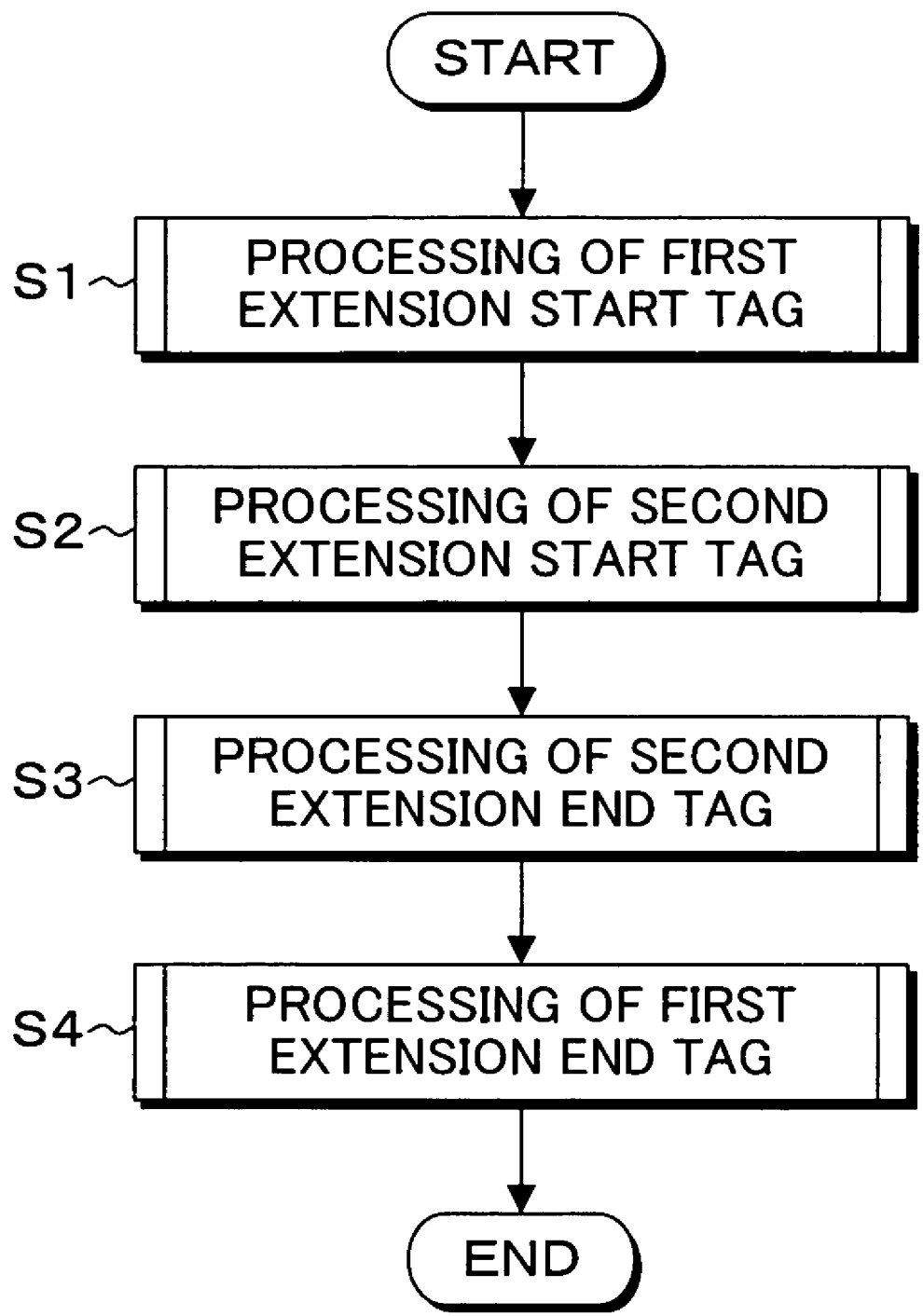
FIG. 15 is a flowchart of processing to create $\tau_\lambda$ component list from the source file of FIGS. 13A and 13B.
Figure 16:
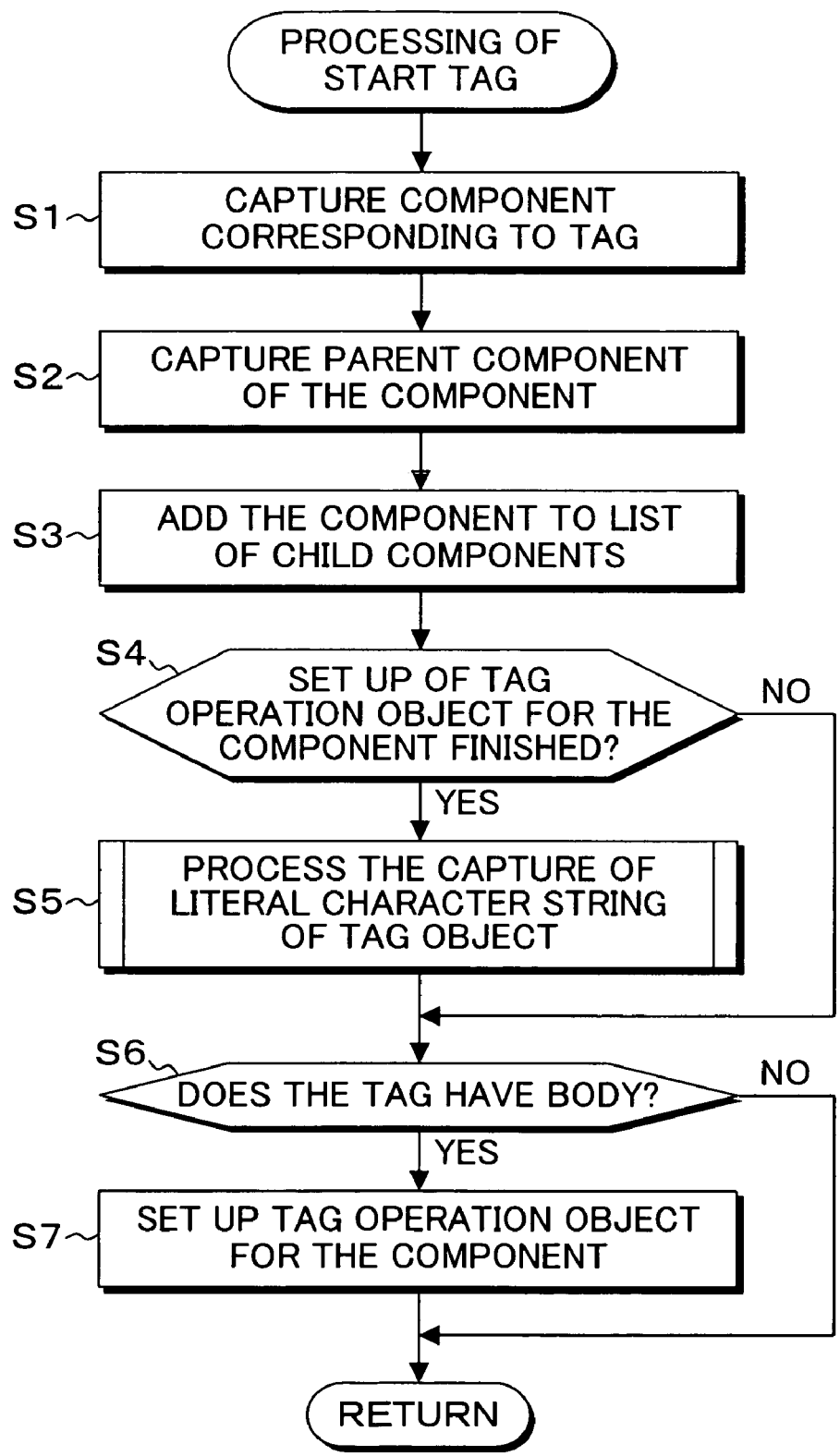
FIG. 16 is a flowchart of the start tag processing of FIG. 15.

FIG. 15 is a flowchart to create a component list from the source file 80 in FIG. 13A. In processing of FIG. 15, processing of the first extension start tag is executed in step S I. Processing of the second extension start tag is executed in step S2. Processing of the second extension end tag is executed in step S3. Processing of the first extension end tag is executed in step S4. The processing of a start tag of Step S1 and Step S2 are executed in the subroutine flowchart in FIG. 16. The explanation of the processing of the start tag of FIG. 16 using the tag A in FIG. 13B corresponding to the first extension start tag in FIG. 13A will be as follows. Capture the component 84 corresponding to the tag A at Step S1. Next, capture the parent component of the component 84 at Step S2. Add the component 84 of the tag A to the child component list at Step S3. It is to be noted that the parent component in Step S2 and Step S3 appeared before the tag A in FIG. 13B and the processing is already completed. Next, check if the setup of the extension child component operation object for the component 84 of the tag A is finished or not at Step S4. In this case no setup was done. Skip, therefore, step 5 and check if the tag A has a body or not at Step S6. The tag A in FIG. 13B has the body from the second line to the fourth line. Proceed, therefore, to step 7 and setup the extension child component operation for the component 84 of the tag A. Then return to the FIG. 15. In this way the processing of the first extended start tag of the step S1 in FIG. 15 ends. Upon the completion of this processing, the processing of the second extended start tag at the step S2 will be carried out. The processing of this second extension start tag is the processing of the <tag B> in the third line of FIG. 13B. Thus, the explanation of the start tag B referring to FIG. 16 will be as follows. Capture the component 88 corresponding to the tag A in step S1. Next, capture the parent component 84 of the component 88 at step 2. Also, add the component 88 to each of the child component list 94 and the extension child component list 96 at step 3. Next, check if the setup of the extension child component operation object for the component 84 of the tag A is finished or not at Step S4. In this case, the setup of the extension child component operation object is finished at the last processing of the start tag A. Proceed to step 5, therefore, and execute the processing of capture of the literal character string.

Figure 17:
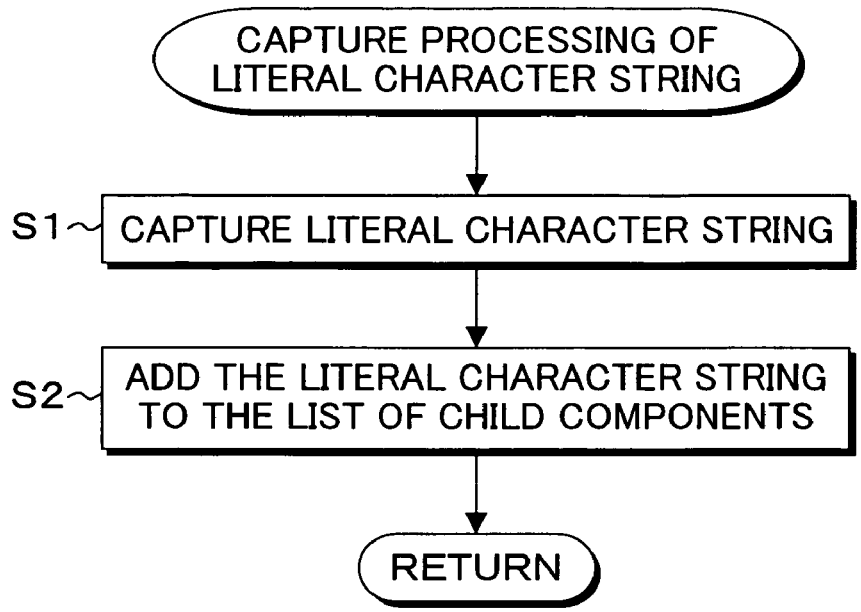
FIG. 17 is a flowchart of the literal character string acquisition processing of FIG. 15.
Figure 18:
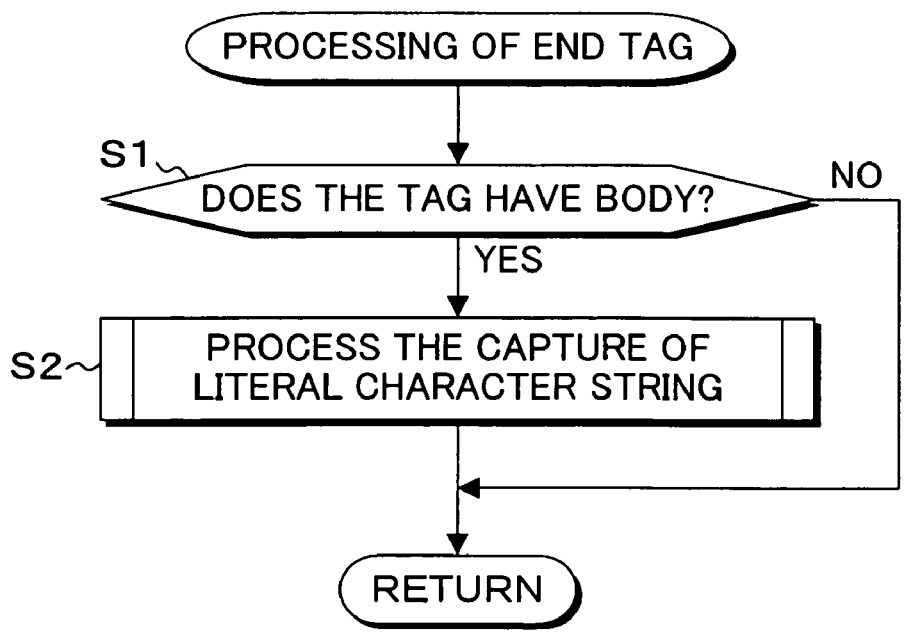
FIG. 18 is a flowchart of the end tag processing of FIG. 15.

The processing of the capture of the literal character string at step 5 is executed with the flowchart of the subroutine in FIG. 17. In FIG. 17, the literal character string outputted in the buffer at step S1 at the time is captured. Then, the literal character string captured at step S2 is added to the extension child component list 96 as the literal character string 88 and returns to FIG. 16. Successively checks if the tag B has a body or not in step S6 in FIG. 16. As in the third line in FIG. 13B, the tag B has no body. The setup of the extension child component operation object for the tag B of the component 88 in the step S7 is, therefore, skipped and returns to the main routine in FIG. 15. In FIG. 15, the processing of the </tag B> of FIG. 13B becoming the second extension end tag in step S3 is executed next. This tag end processing is executed with the flowchart of the subroutine in FIG. 18. In the end tag process in FIG. 18, checks if the tag B has a body or not in step in Si. Since the tag B has no body, the processing of capturing the literal character string is skipped and returns to FIG. 15. Subsequently, the processing of the <tag A> of the second line in FIG. 13B is executed as the processing of the first extension end tag of step S4 in FIG. 15. In this end processing, the subroutine of FIG. 18 is also executed with the flowchart and checks if the tag A has a body or not at step S1. Since the tag A has the body, the processing to capture the literal character string is executed. Captures the literal character string with the subroutine flowchart in FIG. 17. Namely, capture the literal character string <br> outputted in the output buffer at the time at step S1 in FIG. 17. The sequence of processing ends by returning to the extension child component list 96 as the literal character string 90 in step S2 in the main routine in FIG. 15. Here, the explanation is about the construction of processing to create the extension child component list that stores literal character strings without changing the JSF specification in the present invention. The following method can be used in the case the JSF specification is allowed to change.

(Method 1)

The component tree of FIG. 14A is taken as an example. Read the output buffer at the time when the processing of the child tag B to the tag A begins. Hold the literal character string hr as a component in the extended component list next. Successively store the component of the tag B that appears next to the literal character string in the extended component list. In this method, the child tag B executes the processing to create the extension child component list. Therefore, it is necessary to have the processing that captures the literal character string and add the literal character string to the extension child component. Also, it is necessary to reconstruct the extension child component list to add the component of the child tag B that appears next.

(Method 2)

At a time when the processing of the child tag B begins, a signal of the appearance of the child tag B is notified to the parent tag A. Upon receiving this signal, the parent tag executes the processing to capture the literal character string, the processing to add the literal character string to the extension child component list, and the processing to add the component of the tag B that appears next. In this method, the implementation of the capturing function of the literal character string can be limited to the parent tag A, that is a new offer. With the child tag B, the implementation of the mechanism of sending a signal at the time of the processing of the tag is needed. Since the existing JSF tags are not be able to use as the child tag in this way, it is necessary to reconstruct the child tag.

In addition, the present invention provides a web screen creation processing program executed by a computer of a server and is provided with the procedure shown in the flowchart of the FIG. 15 to FIG. 18. While the present invention has been described based on the embodiment, it is not intended to be limited thereto, but encompasses proper modifications without impairing the objects and the advantages. The present invention is not restricted by numerical values shown in the embodiment.

What is claimed is:

1. A web screen creation method of a server using extension tags that dynamically display on a web screen content provided for standard tags displaying the content fixedly on the web screen, to create source statements that describe extension tag statements to display a component dynamically on the web screen, the server outputting HTML and displaying the component on the web screen of a browser by executing a component tree constructed based on the extension tag statements of the source statements, the method comprising:

a source statement describing step of directly describing literal character strings without using extension tags for source statements that display a component made to display the content on the web screen repeatedly;

a tree construction step of constructing a component tree containing the literal character strings by executing the source statements; and an HTML output step of outputting HTML through the execution of each component of the component tree, to allow the display of the component made to repeatedly display the content on the web screen of the browser, wherein the source statement describing step includes describing, as the source statements allowing the display of the component made to display the content repeatedly on the web screen, a first extension tag statement specifying a drawing format of the content, the first extension tag statement having a first extension start tag and a first extension end tag, and a first literal character string specifying the output start position of the content described in the body of the first extension tag statement, a second extension tag statement without body indicating an iteration value, the second extension tag statement having a second extension start tag and a second extension end tag, and a second literal character string specifying the output end position of the content, and wherein the tree constructing step includes:

capturing a first component corresponding to the first extension start tag and adding the first component to a child component list of a preceding parent component, determining the first extension tag having the body and setting up an extension child component operation object for the first component, capturing a second component corresponding to the second extension start tag and adding the second component to a child component list and an extension child component list of the first component, determining that the extension child component operation object is set for the first component and adding the first literal character string such that the first literal character string is positioned before the first component of the extension child component list, determining that the second extension end tag statement has no body and ending the processing of the second extension end tag, and determining the first extension tag having the body, capturing the second literal character string and adding the second literal character string to the extension child component list.

2. The method according to claim 1, wherein the tree construction step includes:

registering in advance a class provided with the extension component list as a variable and with a method to store the literal character string in the extension child component list as operation, and upon the processing of the first extension start tag, assigning to the class a value that has the first component captured corresponding to the first extension start tag as the parent component and generating the extension child component operation object.

3. The method according to claim 2, wherein a method of the extension child component operation object is invoked by the second extension start tag processing, and includes capturing the first literal character string outputted to then an output buffer at that time and storing the first literal character string in the extension component list, and wherein the method is invoked by the first extension end tag processing and includes capturing the second literal character string outputted to the output buffer at that time and storing the second literal character string in the extension child component list.

4. The method according to claim 1, wherein the standard tag displaying the content fixedly on the web screen is provided by JavaServer Pages (JSP), and wherein the extension tag displaying the component dynamically on the web screen is provided by JavaServer Faces.

5. A computer-readable storage medium which stores a web screen creation program operable to drive a computer of a server using extension tags that dynamically display on a web screen content provided for standard tags displaying the content fixedly on the web screen, to create source statements that describe extension tag statements to display a component dynamically on the web screen, the server outputting HTML and displaying the component on the web screen of a browser by executing a component tree constructed based on the extension tag statements of the source statements, to execute:

a source statement describing step of directly describing literal character strings without using extension tags for source statements that display a component made to display the content on the web screen repeatedly;

a tree constructing step of constructing a component tree containing the literal character strings by executing the source statements; and an HTML output step of outputting HTML through the execution of each component of the component tree, to allow the display of the component made to repeatedly display the content on the web screen of the browser, wherein the source statement describing step includes describing, as the source statements allowing the display of the component made to display the content repeatedly on the web screen, a first extension tag statement specifying a drawing format of the content, the first extension tag statement having a first extension start tag and a first extension end tag, and a first literal character string specifying the output start position of the content described in the body of the first extension tag statement, a second extension tag statement without body indicating an iteration value, the second extension tag statement having a second extension start tag and a second extension end tag, and a second literal character string specifying the output end position of the content, and wherein the tree constructing step includes:

capturing a first component corresponding to the first extension start tag and adding the first component to a child component list of a preceding parent component, determining the first extension tag having the body and setting up an extension child component operation object for the first component, capturing a second component corresponding to the second extension start tag and adding the second component to a child component list and an extension child component list of the first component, determining that the extension child component operation object is set for the first component and adding the first literal character string such that the first literal character string is positioned before the first component of the extension child component list, determining that the second extension end tag statement has no body and ending the processing of the second extension end tag, and determining the first extension tag having the body, capturing the second literal character string and adding the second literal character string to the extension child component list.

6. The storage medium according to claim 5, wherein the tree constructing step includes:
registering in advance a class provided with the extension component list as a variable and with a method to store the literal character string in the extension child component list as operation, and
upon the processing of the first extension start tag, assigning to the class a value that has the first component captured corresponding to the first extension start tag as the parent component and generating the extension child component operation object.

7. The storage medium according to claim 6, wherein a method of the extension child component operation object is invoked by the second extension start tag processing, and includes capturing the first literal character string outputted to an output buffer at that time and storing the first literal character string in the extension component list, and wherein the method is invoked by the first extension end tag processing and includes capturing the second literal character string outputted to the output buffer at that time and storing the second literal character string in the extension child component list.

8. The storage medium according to claim 5, wherein the standard tag displaying the content fixedly on the web screen is provided by JavaServer Pages (JSP), and wherein the extension tag displaying the component dynamically on the web screen is provided by JavaServer Faces.

9. A server using extension tags that dynamically display on a web screen content provided for standard tags displaying the content fixedly on the web screen, to create source statements that describe extension tag statements to display a component dynamically on the web screen, the server outputting HTML and displaying the component on the web screen of a browser by executing a component tree constructed based on the extension tag statements of the source statements, the server comprising:
  a source statement describing unit directly describing literal character strings without using extension tags for source statements that display a component made to display the content on the web screen repeatedly;
  a tree constructing unit constructing a component tree containing the literal character strings by executing the source statements; and
  an HTML output unit outputting HTML through the execution of each component of the component tree, to allow the display of the component made to repeatedly display the content on the web screen of the browser,
  wherein the source statement describing unit describes, as the source statements allowing the display of the component made to display the content repeatedly on the web screen,
  a first extension tag statement specifying a drawing format of the content, the first extension tag statement having a first extension start tag and a first extension end tag, and
  a first literal character string specifying the output start position of the content described in the body of the first extension tag statement, a second extension tag statement without body indicating an iteration value, the second extension tag statement having a second extension start tag and a second extension end tag, and a second literal character string specifying the output end position of the content, and wherein
the tree constructing unit:
captures a first component corresponding to the first extension start tag, to add the first component to a child component list of a preceding parent component,
determines the first extension tag having the body, to set up an extension child component operation object for the first component,
captures a second component corresponding to the second extension start tag, to add the second component to a child component list and an extension child component list of the first component,
determines that the extension child component operation object is set for the first component, to add the first literal character string such that the first literal character string is positioned before the first component of the extension child component list,
determines that the second extension end tag statement has no body, to end the processing of the second extension end tag, and
determines the first extension tag having the body, to capture the second literal character string and add the second literal character string to the extension child component list.

10. The server according to claim 9, wherein the tree constructing unit:
registers in advance a class provided with the extension component list as a variable and with a method to store the literal character string in the extension child component list as operation, and
upon the processing of the first extension start tag, assigns to the class a value that has the first component captured corresponding to the first extension start tag as the parent component, to generate the extension child component operation object.

11. The server according to claim 10, wherein a method of the extension child component operation object is invoked by the second extension start tag processing, and includes capturing the first literal character string outputted to an output buffer at that time and storing the first literal character string in the extension component list, and wherein the method is invoked by the first extension and tag processing and includes capturing the second literal character string outputted to the output buffer at that time and storing the second literal character string in the extension child component list.

12. The server according to any one of claims 9, 10, or 11, wherein the standard tag displaying the content fixedly on the web screen is provided by JavaServer Pages (JSP), and wherein the extension tag displaying the component dynamically on the web screen is provided by JavaServer Faces.

* * * * *

UNITED STATES PATENT AND TRADEMARK OFFICE
CERTIFICATE OF CORRECTION

| | | |
|---|---|---|
| PATENT NO. | : 7,325,189 B2 | Page 1 of 1 |
| APPLICATION NO. | : 11/068156 | |
| DATED | : January 29, 2008 | |
| INVENTOR(S) | : Kurumai et al. | |

It is certified that error appears in the above-identified patent and that said Letters Patent is hereby corrected as shown below:

Col. 13, line 63, delete "then".

Signed and Sealed this

Seventeenth Day of June, 2008

JON W. DUDAS
*Director of the United States Patent and Trademark Office*